Patented Jan. 15, 1924.

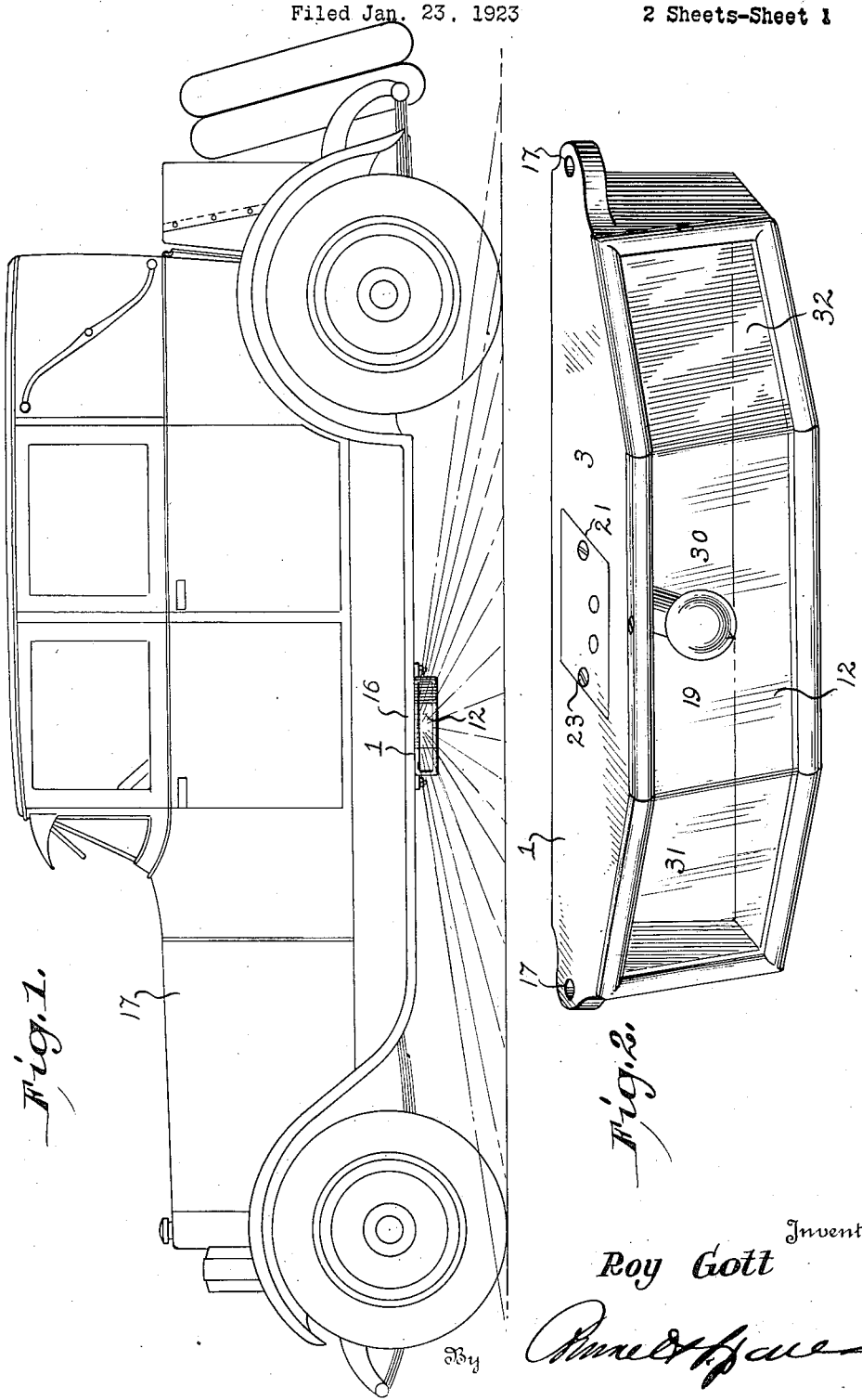

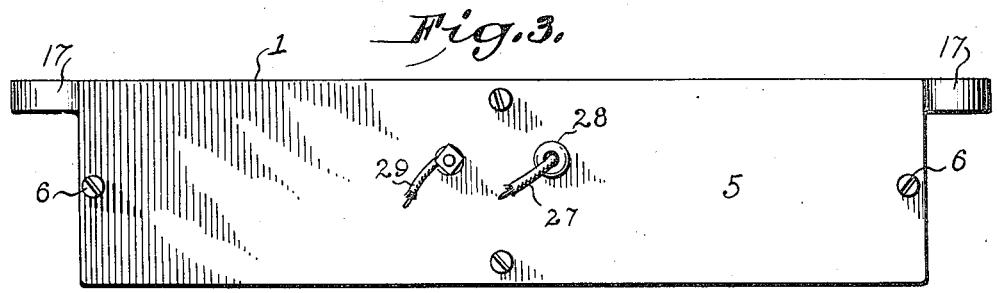
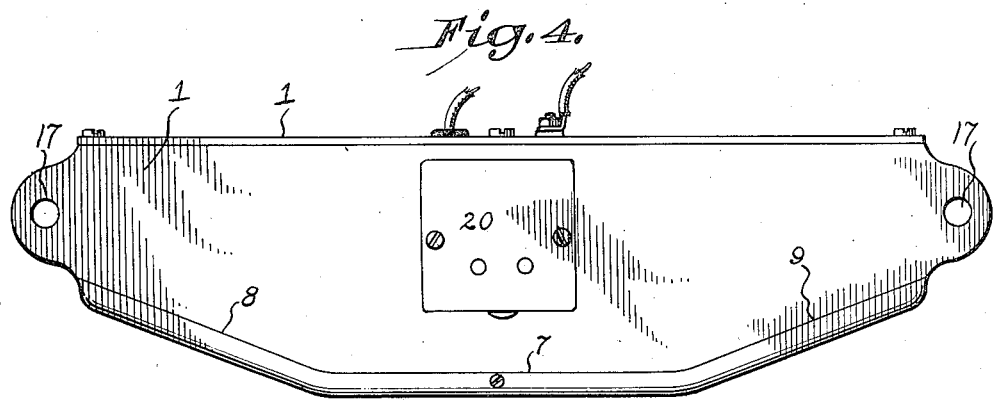
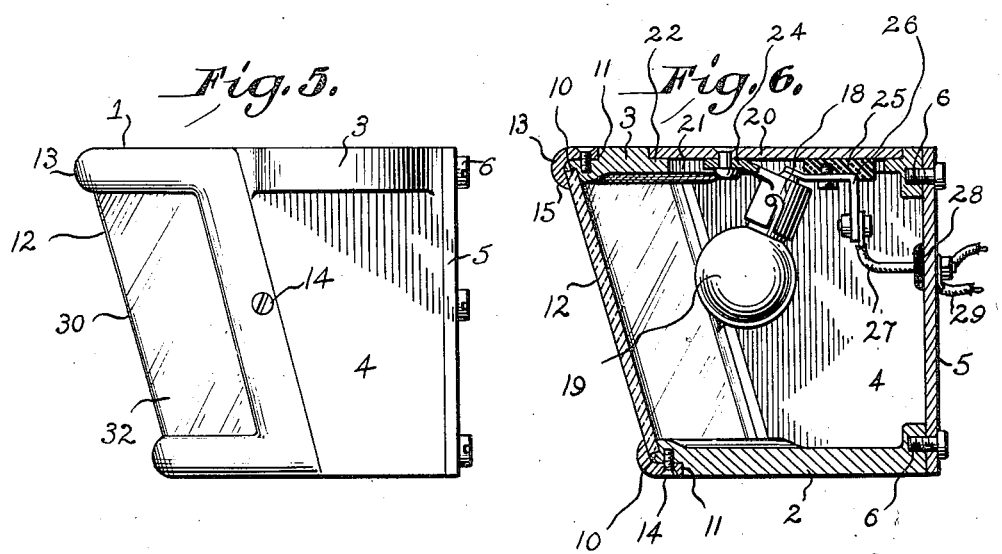

1,481,057

UNITED STATES PATENT OFFICE.

ROY GOTT, OF CENTRALIA, ILLINOIS.

AUTOMOBILE LIGHT.

Application filed January 23, 1923. Serial No. 614,438.

*To all whom it may concern:*

Be it known that I, ROY GOTT, a citizen of the United States, residing at Centralia, in the county of Marion and State of Illinois, have invented new and useful Improvements in Automobile Lights, of which the following is a specification.

This invention relates to automobile lights, and particularly to side lights for vehicles of this character.

The primary object of the invention is to provide a side light which is constructed and adapted to be arranged, when applied, so as to illuminate the side of the road substantially the entire length of the vehicle, and which will throw the light outwardly, forwardly, rearwardly and downwardly upon the road, whereby illumination is furnished to enable a person to see clearly and avoid bad places when entering or leaving the car, and whereby illumination of a character is also furnished to enable the driver to see clearly when using headlights "dim" so as to observe the condition of the road and how close he is to the side of the road in order to avoid liability of ditching the car.

A further object of the invention is to provide a lighting device which may be secured upon the underside of the running board of the vehicle, whereby the driver and others will be protected from glare, while proper illumination for the purposes described is furnished.

A still further object of the invention is to provide a side light which is adjusted for use as a parking light, which may be easily applied and removed without visibly marring the vehicle, and which is simple, reliable and efficient in construction and adapted to be manufactured and installed at a comparatively low cost.

With these and other objects in view, the invention consists of the features of construction, combination and arrangement of parts, hereinafter fully described and claimed, reference being had to the accompanying drawings, in which:—

Figure 1 is a side elevation of an automobile, showing the application of my invention to the running board at one side thereof.

Figure 2 is a perspective view of the lighting device per se.

Figures 3, 4 and 5 are, respectively, a rear elevation, top plan view and end elevation of the same, Figure 6 is a central, vertical front-to-rear section taken through the lighting device.

In carrying my invention into practice I provide a lighting device comprising an elongated casing 1, including in its construction a bottom wall 2, a top wall 3 and end walls 4. These walls 2, 3 and 4 are preferably cast as an integral unit forming the body of the casing. The walls 2 and 3 have their rear edges arranged substantially in the same vertical plane, and at the rear the casing is normally open and adapted to be closed by a vertically disposed rear wall or cover plate 5 secured in position by screws or other suitable fastenings 6. The removal of this rear wall or cover plate 5 permits access to the interior of the casing, without disturbing any material parts, for the purpose of making repairs or replacements whenever the same becomes necessary.

The casing 1 is of novel construction, particularly as regards the formation of its front portion and the provision of means for casting light rays therethrough. As shown, the front edges of the bottom and top walls 2 and 3 are provided with straight central portions 7 and oblique end portions 8 and 9. The central portions 7 are disposed in planes substantially parallel with the vertical plane of the rear wall 5, while the portions 8 and 9 extend inwardly and forwardly and rearwardly, respectively, at equal oblique angles, the casing being thus of maximum width at the center and progressively diminishing from the terminals of the portions 7, through the obliquity of the portion 6, toward the end walls 4. As shown, also, the top wall 3 is throughout of greater width than the bottom wall 2, the forward edge of the wall 3 thus projecting forwardly to a greater extent than the forward edge of the wall 2.

The walls 2 and 3 are rabbeted at their forward edges to provide outer marginal grooves or recesses 10 and inner marginal grooves or recesses 11. The grooves 10 are adapted to receive the top and bottom edges of a transparent front panel 12 made of glass or other suitable transparent or substantially transparent material, the end edges of which are fitted within similar grooves in the forward edges of the end walls 4. The grooves 11 are adapted to receive a panel holding frame 13 conforming in shape to the front edges of the walls of the casing and secured in position by screws or other suitable fastenings 14. This frame 13 is composed of upper and lower longitudinal bars and end bars, which end bars engage grooves similar to the grooves 11 in the end walls 4, each bar being seated and secured in a wall recess 11 and having an inturned flange 15 arranged to bear against the adjacent edge of the glass and hold the same confined within the recesses 10, whereby the transparent panel is firmly and detachably held in position. The device is adapted in practice to be secured to the underside of a running board 16 of an automobile or other similar vehicle 17, the top wall 3 being arranged to bear against the underside of the running board and being provided at its ends with apertured ears 17 for the passage of bolts or other suitable fastenings whereby the lighting device is secured in operative position, as clearly shown in Figure 1.

Arranged within the casing is an electric lamp socket 18 of suitable construction to receive an incandescent bulb 19, which socket and bulb are supported in position by a bracket plate 20. This bracket plate 20 is arranged to cover an opening 21 formed in the top plate 3 and to seat flush within a groove 22 formed in said wall 3 about the opening, said bracket plate being secured in position by screws or other suitable fastenings 23. The socket 18 is provided with an arm 24 riveted, soldered or otherwise suitably fastened to the plate 20 and which, through said plate, electrically connects said socket with the body of the casing. To the underside of plate 20 is fastened a block 25 of insulating material, to which block is secured one arm of a contact strip 26, which arm electrically engages the central contact of the lamp socket, the other arm of said contact strip being suitably connected with a positive conductor 27 leading outwardly through a bushing 28 fitted in an opening in the wall 5, whereby the lamp is connected with the positive bulb of the storage battery or other source of current supply of the vehicle. Current is thus supplied through the conductor 27, strip 26 and central contact of the lamp to the filament of the bulb, the circuit being completed by the return or grounding connection through the socket or shell 18, arm 24 and parts of the casing, including the wall 5, to which is suitably fastened a negative conductor 29 which leads to the negative bulb of the battery or is in suitable grounding connection with the vehicle. The removal of the plate 5 permits access in an obvious manner to the interior of the casing for the purpose of inspecting, repairing or adjusting the bulb or current supplying connections, or for the purpose of replacing a worn out bulb with a new one, while removal of the plate 20 adapts the lamp and its immediate conducting connections to be detached as a unit, and also permits of the application of said parts as a unit in the assemblage of the device.

In practice, as stated, the lighting device is designed to be applied to the underside of the running board 16 of an automobile or other similar vehicle 17. One of said lighting devices may be applied to the running board at the right hand side of the vehicle, or the left hand side alone, or to both running boards. When applied to the running board at the right hand side, the device is designed to light up the roadway at such side of the vehicle in such manner as to enable the driver to see the condition of the road bed close to curves or ditches, while the use of a light upon the left hand side enables the driver to have a clear view of passing vehicles traveling in the opposite direction, thus enabling him to guide his vehicle in such manner as to avoid obstacles and ditching the vehicle and collisions with other traveling vehicles.

It will be observed that by the novel form and construction of the front of the casing and the transparent panel applied thereto, the parts of the panel are arranged to throw the light rays so as to secure certain desirable and important advantages. By reason of the construction described it will be seen that the panel has a straight, central portion 30 and oblique front and rear end portions 31 and 32 considered in the direction of travel of the vehicle. The central portion 30 extends in a general line parallel with the line of travel of the vehicle, while the front portion 31 inclines in an inward and forward direction and the rear portion 32 inclines in an inward and rearward direction. The panel as a whole also slopes inwardly and downwardly from the front edge of the top wall 3 to the front edge of the bottom wall 2. By reason of this construction light rays will be thrown directly outward laterally from the bulb 19 through the panel 30, while the front panel portion 31 will throw the light rays at an angle outwardly and forwardly, and the rear panel portion 32 will throw the light rays at an angle outwardly and rearwardly, so that the light rays projected cover an area at least equal to the length of the vehicle or the distance between the front and rear walls of the vehicle. The downward and inward inclination of the parts 30, 31 and 32 will also cast the light rays at an angle down upon the ground. As a result a fan-shaped beam of light will be thrown outwardly and downwardly upon the ground so as to illuminate the whole of the vehicle at one side, the down-cast rays showing clearly the condition of the road while at the same time eliminating all glare and the projection of the rays into the faces of persons entering the vehicle with which the light is equipped or the eyes of the drivers or passengers of other passing vehicles traveling along the same roadway. The light applied at either side will therefore enable the driver of the vehicle to clearly see the road at that side to avoid passing too close to ditches, other vehicles or obstructions, and the light will be sufficient for the purpose even when the driver dims his headlights to prevent the glare therefrom from being thrown into the eyes of the driver of a vehicle passing in the opposite direction, giving the driver of the vehicle equipped with the light clear vision and complete control of his vehicle under all conditions of service. The running board in this connection serves as a shield to prevent any light rays being thrown upward and the arrangement of the light at a side of the vehicle adapts it for use as a parking light and also as a convenient illuminating means to light up the roadway to enable a person to enter and leave a vehicle while complete illumination of the roadway and portions of the vehicle is afforded. The device thus forms a convenient adjunct to the vehicle for these purposes of illumination and enables the objections to the use of ordinary headlights and parking lights alone to be effectually overcome. The construction of the device not only adapts it to be manufactured, sold and installed at a comparatively low cost, but provides an illuminator which is attractive in appearance and which affords ready and complete access to all parts for cleaning, repairs, renewals and all other purposes without the necessity of dismantling the entire structure.

Having thus fully described my invention, I claim:—

1. An automobile side light of the character described comprising an elongated casing having a front transparent panel, and illuminating means in said casing for projecting rays of light through the panel, said panel being provided with a straight central surface for projecting the light rays straight out laterally from the casing and front and rear inclined surfaces for projecting the light rays laterally and respectively in a forward and rearward direction from the casing, all of said panel surfaces being also inclined at a single continuous downward and inward angle between its top and bottom edges so as to throw unbroken light rays therefrom down against the road surface.

2. An automobile side light of the character described comprising an elongated casing formed of integral bottom, top and end walls, said casing being normally open at the front and back, and said top and bottom walls having their rear edges in vertical alinement and their front edges provided with straight central portions parallel with their rear edges and inwardly and rearwardly inclined front and rear portions, the front edge of the top wall extending outwardly beyond the front edge of the bottom wall, a removable rear wall secured in abutting relation to the rear edge of the top, bottom and end walls, illuminating means in said casing, and a transparent front panel closing the space between the front edges of the top, bottom and end walls, said panel having a straight central portion and inclined end portions conforming to the said straight central portions and inclined front and rear portions of the front edges of the top and bottom walls, and said panel as a whole sloping inwardly and downwardly continuously between its top and bottom edges at an angle conforming to the difference in degree of outward projection of the front edges of the top and bottom walls.

3. An automobile side light of the character described comprising an elongated casing formed of integral bottom, top and end walls, said casing being normally open at the front and back, and said top and bottom walls having their rear edges in vertical alinement and their front edges provided with straight central portions parallel with their rear edges and inwardly and rearwardly inclined front and rear portions, the front edge of the top wall extending outwardly beyond the front edge of the bottom wall, the said front edges of the top, bottom and end walls being provided with outer and inner marginal recesses, a removable rear wall closing the rear of the casing, illuminating means within the casing, a transparent front panel marginally engaging the inner marginal recesses in the front edges of the top, bottom and end walls, said panel having a straight central portion and inclined end portions conforming to the said straight central portions and inclined front and rear portions of the front and rear portions of the front edges of the top and bottom walls, and said panel as a whole sloping inwardly and downwardly at an angle conforming to the difference in degree of outward projection of the front edges of the top and bottom walls, and a panel holding frame secured to the casing and conforming to the marginal outline of the panel, said panel having an edge portion fitted in the outer marginal recesses of the top, bottom and end walls and an edge portion arranged to bear upon the panel and hold the edge thereof seated in the said inner marginal recesses in said walls.

4. An illuminating device comprising a casing including top, bottom, end and rear walls and a transparent front wall, the top wall having an opening therein, a closure for said opening, a bracket plate secured to the closure, and a lamp supported wholly by said bracket plate and removable therewith and with said closure and arranged to cast the rays therefrom through said transparent front wall.

5. An illuminating device comprising a casing having a bottom wall, top walls and end walls forming a unitary casing, said casing being normally open at the rear and having the rear edges of its top and bottom walls in vertical alinement and having the forward edge of its top wall extending forwardly a greater distance than the forward edge of its bottom wall, the said forward edges of the top and bottom walls being provided with straight central portions and obliquely inclined end portions, a removable rear wall closing the normally open rear portion of the casing, a unitary transparent panel having a straight central portion and oblique end portions conforming to the shape of the front edges of the top and bottom walls and closing the front of the casing, a unitary holding frame of corresponding form securing said panel to the casing walls, and illuminating means arranged within the casing.

In testimony whereof I affix my signature.

ROY GOTT.